Patented Feb. 13, 1923.

1,445,495

UNITED STATES PATENT OFFICE.

ANTOINE REGNOUF DE VAINS, OF MIRIBEL, AIN, FRANCE.

PROCESS FOR RENDERING CHLORIDES OF KETONE SOLUBLE BY MEANS OF ALKALIES.

No Drawing.   Application filed August 31, 1921.   Serial No. 497,352.

*To all whom it may concern:*

Be it known that I, ANTOINE REGNOUF DE VAINS, a citizen of the Republic of France, residing at 10 Rue Henri-Grobon, Miribel, Ain, France, have invented new and useful Improvements in Processes for Rendering Chlorides of Ketone Soluble by Means of Alkalies (for which I have made application in France June 2, 1920), of which the following is a specification.

It is known from the experiments made by Messrs. Cross and Bevan that ligno and pecto-cellulose, lixiviated with a predetermined percentage of alkali, absorb during the chlorination subsequent to lixiviation, a number of atoms of chlorine corresponding to the number of ketone groups (CO) contained in their formula. It is also known that the organic chlorides thus formed, or the oxidation products obtained by the action of chlorine on a semi-paste dissolve in an alkaline lye and finally leave the bare cellulose. This alkaline treatment is relatively costly in that it necessitates a new quantity of fresh alkaline products for the liberation of a definite quantity of cellulose.

Furthermore, it is also known that the excess alkali fixes itself upon the cellulose and gives it a reddish tint. This tint resists all the oxidizing agents hitherto employed for the final bleaching of the cellulose and this represents a great disadvantage.

The present invention is characterized by the application, as solvents, of one or more already used alkaline lyes resulting from the lixiviation of any organic material with a view to automatically effecting the solution of the chloride of lignin (chloride of lignone) as well as of any other oxidation product. When carrying out the process, either with a view to dissolving chlorides of ketones, formed by the action of chlorine on a ligno- or pecto-cellulose, or to dissolving organic products formed by the action of chlorine on a semi-paste of cellulose, the used lye emanating from a lixiviation of cellulosic materials can be used as solvent.

The principle of this reaction is the following:

The alkaline lye acts during lixiviation upon the non-cellulosic materials, as is generally the case with a strong base and a weak acid. The already used lye no longer contains the hydrate but a salt. The chloride of lignone, as well as any other oxidation-product formed by the action of the chlorine on the nearest atoms of hydrogen of the ketonic groups (CO), acts upon the already used lye in the same way as would a strong acid in the presence of a salt arising from the combination of a weak acid with a strong base. It therefore displaces the weak acid from its combination with the base, forming itself a combination with the alkaline ion and thus renders the chlorinated or ozidized organic products soluble.

The reaction therefore stops of its own accord as soon as the whole of the products to be rendered soluble has reacted and the lye cannot fix itself upon the cellulose and cannot therefore give it a reddish tint.

A simple washing operation suffices to get rid of the weak acid set free, the chloro-organic alkaline compound, the oxidation products rendered soluble, as well as of the excess of lye.

I claim;

1. Process for the solution of chlorides of ketone formed by the action of chlorine on ligno- or pecto-cellulose consisting in treating said material with alkaline solutions emanating from the lixiviation of cellulosic material.

2. Process for the solution of organic products oxidized by the action of chlorine on a semi-paste of cellulose, consisting in treating the material with already used alkaline solutions emanating from the lixiviation of cellulosic material.

ANTOINE REGNOUF DE VAINS.